US011883827B2

(12) United States Patent
Soldan et al.

(10) Patent No.: US 11,883,827 B2
(45) Date of Patent: Jan. 30, 2024

(54) MATERIAL REDUCTION MACHINE WITH DYNAMIC INFEED CONTROL

(71) Applicant: Vermeer Manufacturing Company, Pella, IA (US)

(72) Inventors: Daniel James Soldan, Pella, IA (US); John David Vande Noord, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 285 days.

(21) Appl. No.: 17/151,510

(22) Filed: Jan. 18, 2021

(65) Prior Publication Data

US 2021/0229108 A1 Jul. 29, 2021

Related U.S. Application Data

(60) Provisional application No. 62/965,441, filed on Jan. 24, 2020.

(51) Int. Cl.
*B02C 25/00* (2006.01)
*B02C 18/14* (2006.01)
(Continued)

(52) U.S. Cl.
CPC .............. *B02C 25/00* (2013.01); *B02C 13/02* (2013.01); *B02C 18/14* (2013.01);
(Continued)

(58) Field of Classification Search
CPC ................... B27L 11/005; B27L 11/00; B02C 2013/28663; B02C 18/2283; B02C 21/00;
(Continued)

(56) References Cited

U.S. PATENT DOCUMENTS 3,524,485 A 8/1970 Smith
4,210,289 A 7/1980 Arnoldy
(Continued)

FOREIGN PATENT DOCUMENTS

CN 109107745 A 1/2019
EP 2151156 A2 2/2010
(Continued)

OTHER PUBLICATIONS

Hantian Zhang, Non-Smooth Approach for Contact of Dynamics and Impulse-based Control of Frictional Furuta Pendulum, Bachelor Theses, Jun. 2014 (60 Pages).
(Continued)

*Primary Examiner* — Adam J Eiseman
(74) *Attorney, Agent, or Firm* — Michael Best & Friedrich LLP

(57) ABSTRACT

A material reduction machine includes a prime mover driving a cutting mechanism. An infeed portion engages a piece of material to feed it forward to the cutting mechanism. A sensor senses a machine load parameter via the cutting mechanism and/or prime mover and reports a signal to a controller operatively coupled to the infeed portion to control sequential cutting cycles on the piece of material. The controller utilizes a stored first stop threshold value for stopping a first cutting cycle and continues monitoring the signal as machine load increases momentarily after reaching the first stop threshold. The controller determines and adopts a second stop threshold value based on observation of the machine load parameter indicative of maximum load during the continued monitoring following attainment of the first stop threshold, and further being based on a stored correction factor. The second stop threshold value is used for a second cutting cycle.

23 Claims, 7 Drawing Sheets

(51) Int. Cl.

| | |
|---|---|
| ***B02C 13/02*** | (2006.01) |
| ***B02C 18/22*** | (2006.01) |
| ***B27L 11/00*** | (2006.01) |
| ***B02C 21/02*** | (2006.01) |
| *B02C 18/16* | (2006.01) |

(52) U.S. Cl.

CPC .......... *B02C 18/2291* (2013.01); *B02C 21/02* (2013.01); *B27L 11/00* (2013.01); *B02C 2018/164* (2013.01)

(58) Field of Classification Search

CPC ......... B02C 25/00; B02C 13/02; B02C 18/14; B02C 21/02; B02C 2018/164

See application file for complete search history.

(56) References Cited

U.S. PATENT DOCUMENTS

| | | | | |
|---|---|---|---|---|
| 4,598,745 | A | 7/1986 | Parviainen | |
| 4,865,094 | A | 9/1989 | Stroud et al. | |
| 5,020,579 | A | 6/1991 | Strong | |
| 5,088,532 | A | 2/1992 | Eggers et al. | |
| 5,230,475 | A | 7/1993 | Gerner | |
| 5,588,474 | A | 12/1996 | Hadjinian et al. | |
| 5,881,959 | A | 3/1999 | Hadjinian et al. | |
| 6,814,320 | B1 | 11/2004 | Morey et al. | |
| 6,830,204 | B1 | 12/2004 | Morey | |
| 7,011,258 | B2 * | 3/2006 | O'Halloran | B02C 23/04 241/34 |
| 7,044,409 | B2 | 5/2006 | Stelter et al. | |
| 7,077,345 | B2 | 6/2006 | Byram et al. | |
| 7,232,083 | B2 | 6/2007 | Stelter et al. | |
| 7,523,879 | B2 | 4/2009 | Umeda et al. | |
| 7,654,479 | B2 | 2/2010 | Stelter et al. | |
| 8,583,322 | B2 | 11/2013 | Yamaguchi et al. | |
| 8,844,853 | B2 * | 9/2014 | Hongo | B02C 23/10 241/294 |
| 9,533,310 | B2 | 1/2017 | Dumpor et al. | |
| 10,543,616 | B2 * | 1/2020 | Harness | B02C 18/24 |
| 2009/0264253 | A1 | 10/2009 | Herchick et al. | |
| 2017/0165674 | A1 | 6/2017 | Harrison et al. | |
| 2019/0054476 | A1 | 2/2019 | Green et al. | |
| 2020/0178482 | A1 | 6/2020 | Breja et al. | |

FOREIGN PATENT DOCUMENTS

| | | | | |
|---|---|---|---|---|
| EP | 3854482 | A1 | 7/2021 | |
| JP | 2000136739 | A5 | 5/2000 | |
| JP | 3967497 | B2 | 8/2007 | |
| KR | 20010057426 | A | 7/2001 | |
| WO | 237946 | A2 | 5/2002 | |
| WO | 2017188932 | A1 | 11/2017 | |
| WO | 2018/160197 | A1 | 9/2018 | |
| WO | WO-2021071655 | A1 * | 4/2021 | A01D 34/006 |

OTHER PUBLICATIONS

Vermeer, "BC1200XL Brush Chipper", Operator's manual p. 33, published 2009.

Vermeer, "BC2100XL Brush Chipper FISRT in australia vic 3", You Tube Video: https://www.youtube.com/watch?v=74o-ntG16p0, Jul. 7, 2010, 1 page.

Vermeer, "BC900XL Brush Chipper", You Tube Video: https://www.youtube.com/watch?v=r7DbGo3yF0M, May 29, 2015, 1 page.

Vermeer, "BC1800XL Tier 4 Final Brush Chipper", You Tube Video: https://www.youtube.com/watch?v=r7DbGo3yF0M, Oct. 2, 2015, 1 page.

European Patent Office Action for Related Application No. 22207161.5 dated Apr. 24, 2023 (10 pages).

Extended Search Report issued from the European Patent Office for related Application No. 21152740.3 dated Jun. 22, 2021 (5 Pages).

* cited by examiner

MATERIAL REDUCTION MACHINE WITH DYNAMIC INFEED CONTROL

CROSS-REFERENCE TO RELATED APPLICATIONS

This application claims priority to U.S. Provisional Patent Application No. 62/965,441, filed on Jan. 24, 2020, the entire contents of which are incorporated by reference herein.

BACKGROUND

The present invention relates to material reduction machines, for example chippers and grinders, and more particularly to infeed control for cyclic feeding of material into such material reduction machines.

Chippers typically contain sharp knives that cut material such as whole trees and branches into smaller woodchips. Grinders, on the other hand, typically contain hammers which crush aggregate material into smaller pieces through repeated blows. Example prior art chippers are shown in U.S. Pat. Nos. 10,350,608; 8,684,291; 7,637,444; 7,546,964; 7,011,258; 6,138,932; 5,692,549; 5,692,548; 5,088,532; and 4,442,877; and U.S. Publication No. 2014/0031185, each owned by Vermeer Manufacturing Company; these documents are each incorporated herein by reference in their entirety and form part of the current disclosure. Example grinders are disclosed in U.S. Pat. Nos. 10,350,608; 7,441,719; 7,213,779; 7,077,345; and 6,840,471, each owned by Vermeer Manufacturing Company; these patents are each incorporated herein by reference in their entirety and form part of the current disclosure as well.

Chippers and grinders often include infeed systems for moving material to the knives or hammers to be processed. Some embodiments of the current invention relate particularly to improved infeed systems for chippers and grinders, to chippers and grinders having such improved infeed systems, and to methods of operation.

SUMMARY

In one aspect, the invention provides a material reduction machine including a cutting mechanism and a prime mover coupled with the cutting mechanism to drive the cutting mechanism. An infeed portion is operable to engage a piece of material to be comminuted by the cutting mechanism and to feed the piece of material to the cutting mechanism. A sensor is operable to sense a machine load parameter via detection of at least one of the cutting mechanism and the prime mover. A controller is coupled to the sensor and configured to receive a signal representing the sensed machine load parameter. The controller is operatively coupled to the infeed portion to control stopping and starting of each of a plurality of sequential cutting cycles on the piece of material. The controller is configured to utilize a stored first stop threshold value of the machine load parameter for stopping a first cutting cycle of the plurality of sequential cutting cycles when the sensor signals to the controller that the first stop threshold value is attained, and the controller is configured to continue monitoring the sensor signal as machine load increases momentarily after reaching the first stop threshold. The controller is configured to determine and adopt a second stop threshold value, the second stop threshold value being based on an observation of the machine load parameter indicative of maximum load during the continued monitoring following attainment of the first stop threshold, and further being based on a stored correction factor. The controller is configured to utilize the second stop threshold value for stopping a second cutting cycle of the plurality of sequential cutting cycles following the first cutting cycle when the sensor signals to the control that the second stop threshold value is attained.

In another aspect, the invention provides a material reduction machine including a cutting mechanism, an internal combustion engine coupled with the cutting mechanism to drive the cutting mechanism, and an infeed portion operable to engage a piece of material to be comminuted by the cutting mechanism and to feed the piece of material to the cutting mechanism. A sensor is operable to sense a load on the material reduction machine via detection of droop in the operation speed of at least one of the cutting mechanism and the internal combustion engine. A controller is coupled to the sensor and configured to receive a signal indicative of the sensed droop in the operation speed, the controller being operatively coupled to the infeed portion to control stopping and starting of each of a plurality of sequential cutting cycles on the piece of material. The controller is configured to utilize a stored first operation speed trip point for stopping a first cutting cycle of the plurality of sequential cutting cycles when the sensor signals to the controller that the first operation speed trip point is attained, and the controller is configured to continue monitoring further droop in the operation speed via the sensor signal as machine load increases momentarily after reaching the first operation speed trip point. The controller is configured to determine and adopt a second operation speed trip point, the second operation speed trip point being based on an observation of a minimum operation speed during the continued monitoring following attainment of the first operation speed trip point, and further being based on a stored correction factor. The controller is configured to utilize the second operation speed trip point for stopping a second cutting cycle of the plurality of sequential cutting cycles following the first cutting cycle when the sensor signals to the control that the second operation speed trip point is attained.

In yet another aspect, the invention provides a method of controlling a material reduction machine including a cutting mechanism and a prime mover coupled with the cutting mechanism to drive the cutting mechanism. The prime mover is operated to drive the cutting mechanism at a no load operation speed. A piece of material to be comminuted is fed to the cutting mechanism by operation of an infeed portion to start a first cutting cycle. With a sensor that reports signals to a controller in control of the infeed portion to control stopping and starting of each of a plurality of sequential cutting cycles on the piece of material, a machine load parameter is sensed via detection of at least one of the cutting mechanism and the prime mover. Stopping of a first cutting cycle of the plurality of sequential cutting cycles is triggered via the controller in response to the sensor signaling to the controller that a stored first stop threshold value is attained. With the controller, monitoring of the machine load parameter sensor signal is continued as machine load increases to a maximum load momentarily after reaching the first stop threshold. The controller determines and adopts a second stop threshold value based on the value of the machine load parameter at the time of maximum load following attainment of the first stop threshold, and further based on a stored correction factor. Stopping a second cutting cycle of the plurality of sequential cutting cycles following the first cutting cycle is triggered via the controller in response to the sensor signaling to the controller that the second stop threshold value is attained.

DETAILED DESCRIPTION

Figure 1:
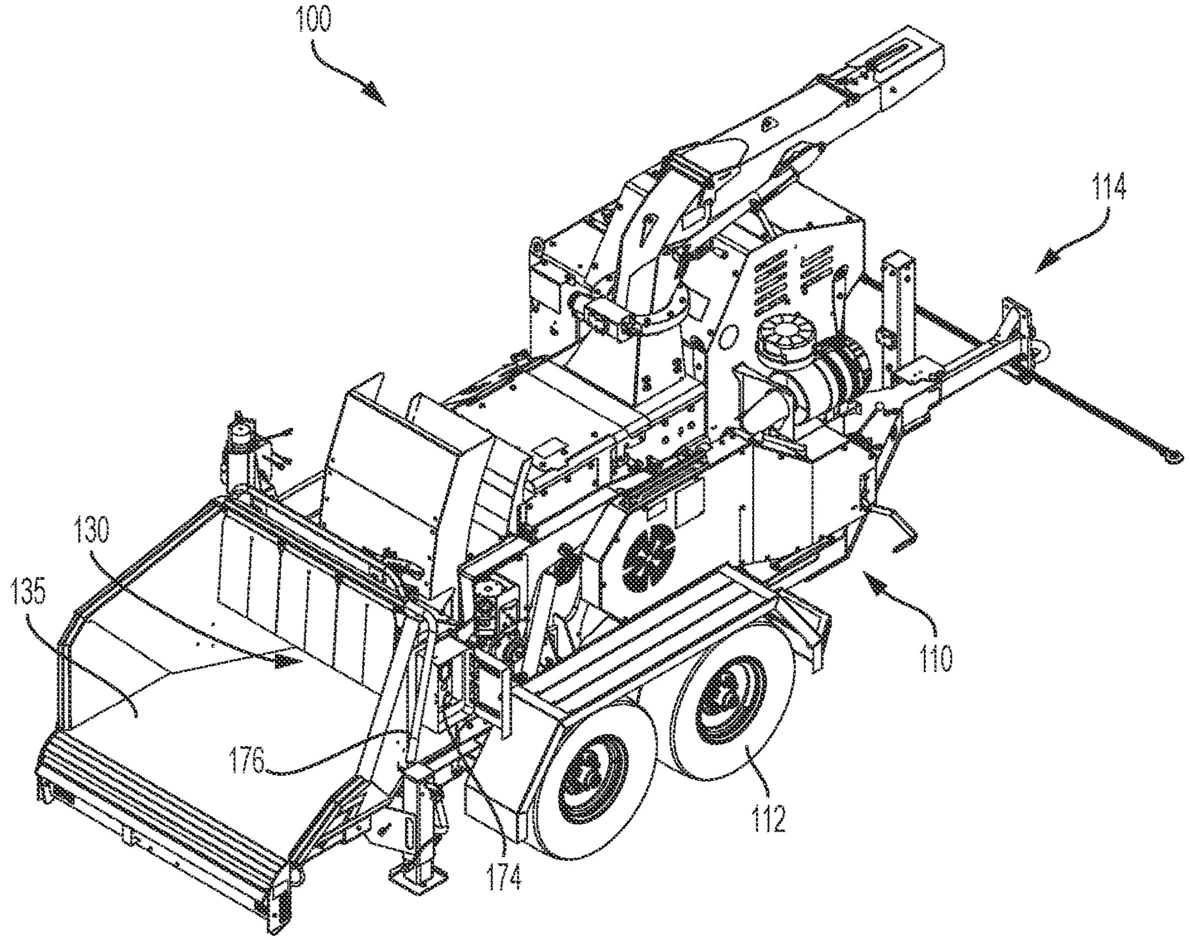
FIG. 1 is a perspective view of a chipper according to one embodiment of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIGS. 1 through 4 illustrate a chipper 100, according to one embodiment. The chipper 100 includes a processing portion 120 for processing material into smaller pieces and an infeed portion 130 for feeding the material to the processing portion 120. A frame 110 supports (and may form part of) the processing portion 120 and the infeed portion 130, and the frame 110 may further include wheels 112 and a hitch 114 to allow travel and transport of the chipper 100. Mobility may not be desirable in all cases, however, and stationary embodiments are also contemplated. The processing portion 120 (FIG. 2) includes a cutting mechanism 124 such as a chipping or cutting drum or a disk cutter. Cutting mechanisms are well known, and any appropriate cutting mechanism (whether now known or later developed) may be used to process material into smaller pieces. The cutting mechanism 124 is driven by a prime mover 128, such as an internal combustion engine (e.g., gasoline or diesel) or an alternative power source(s), such as one or more electric motors. The cutting mechanism 124 can be directly or indirectly driven by the prime mover 128.

Figure 2:
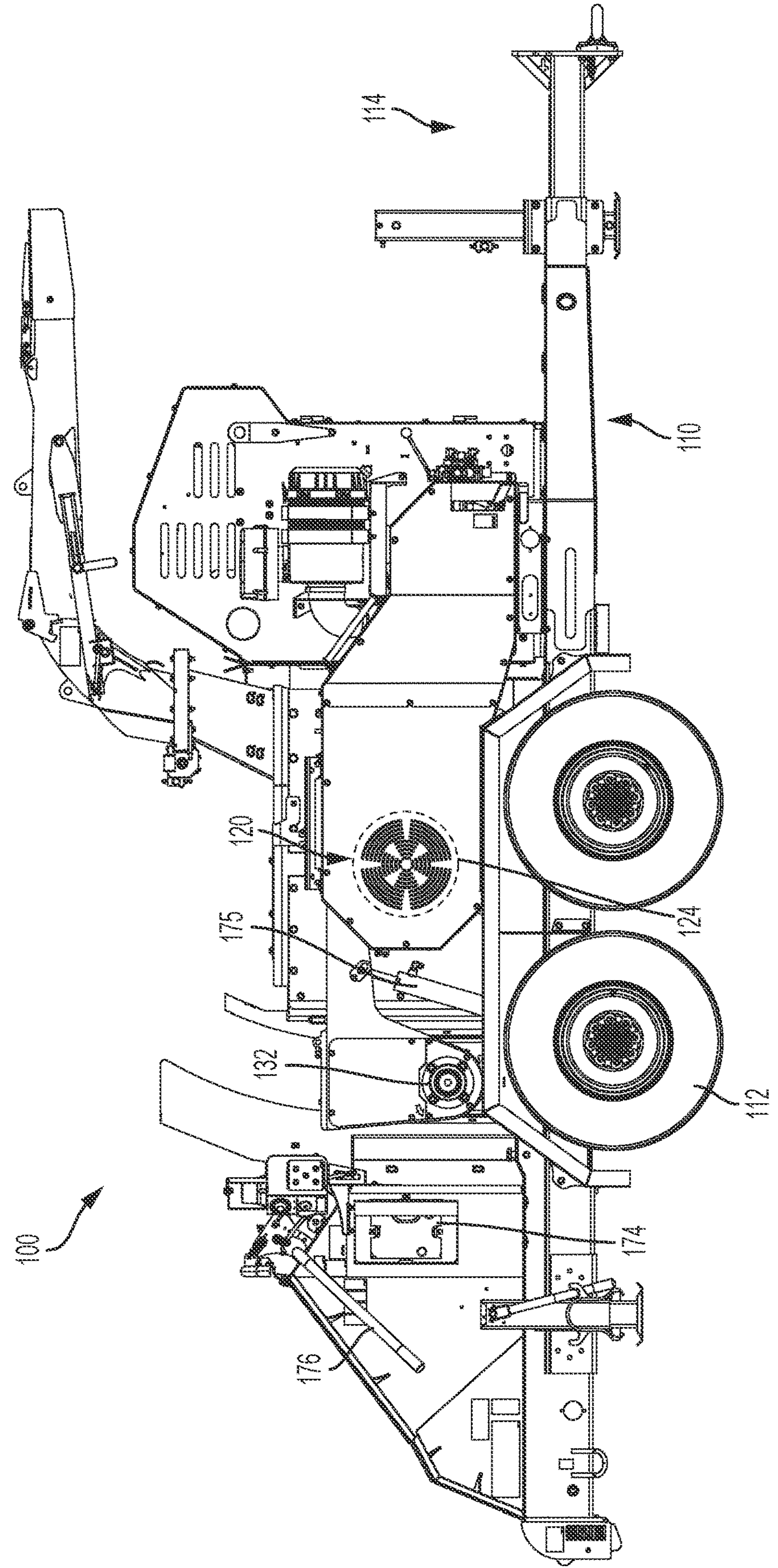
FIG. 2 is a side elevation view of the chipper of FIG. 1.
Figure 3:
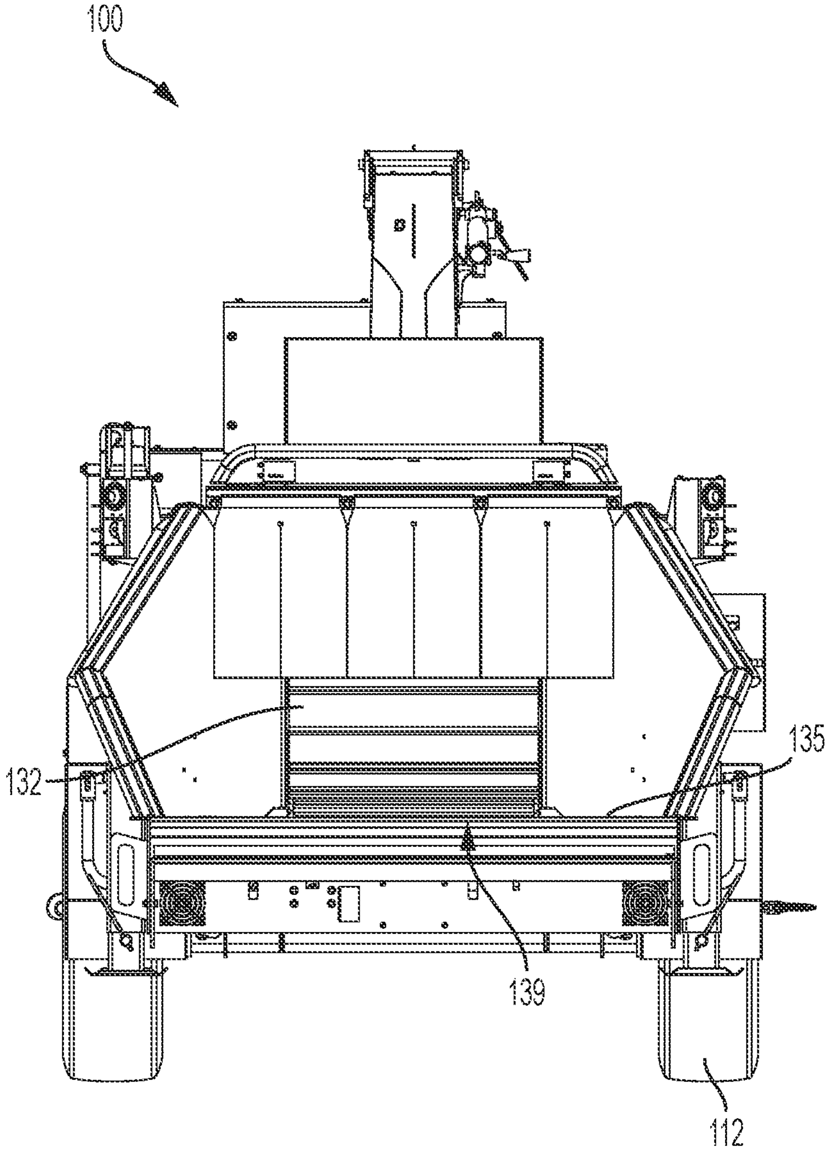
FIG. 3 is a rear elevation view of the chipper of FIG. 1.
Figure 4:
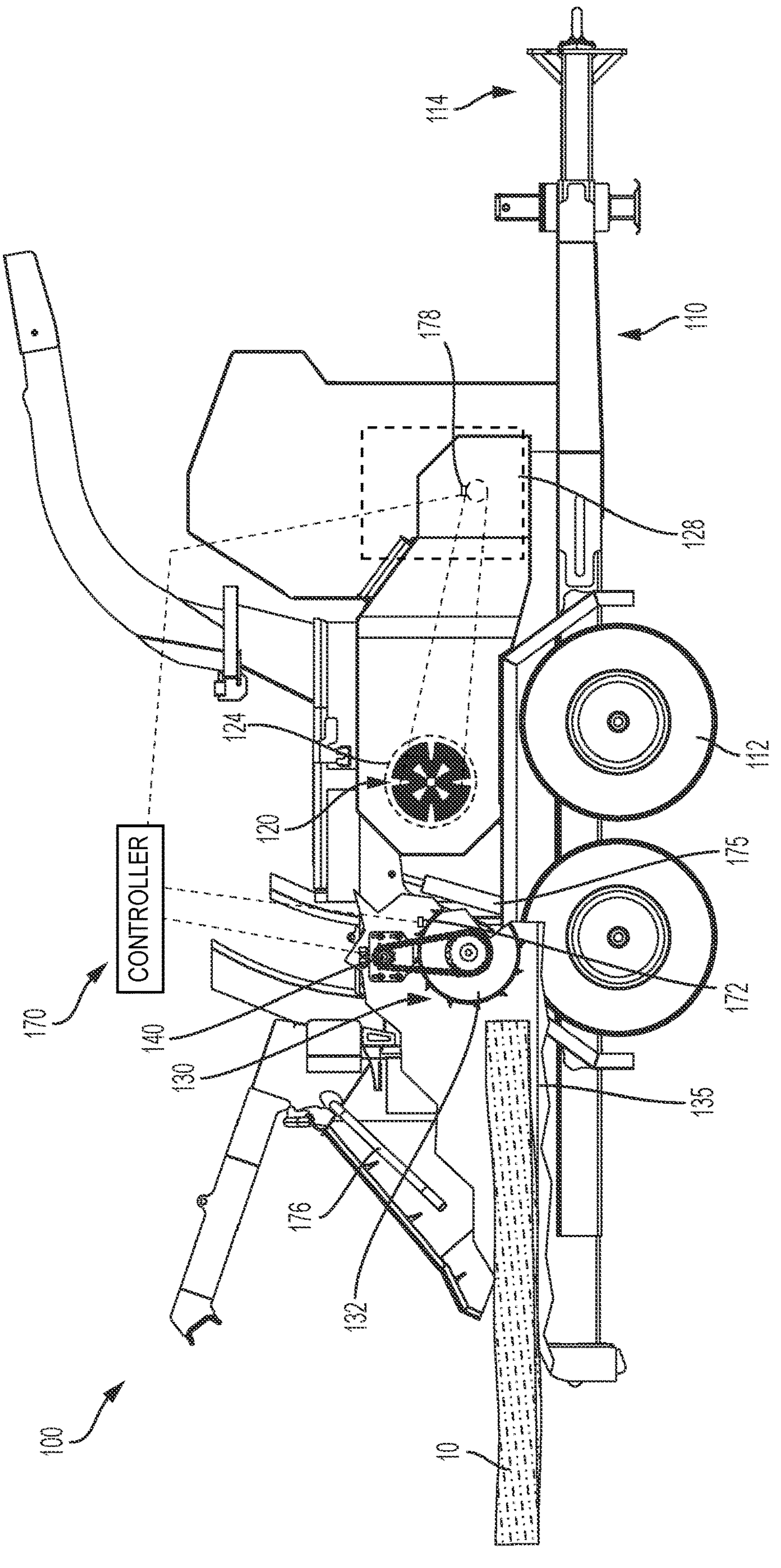
FIG. 4 is a side view of the chipper of FIG. 1, in use with a log and with a cutaway for illustration.

The infeed portion 130 is upstream of the processing portion 120 and includes a feed roller 132 (FIGS. 2-4). The feed roller 132 is selectively actuated by one or more motors 140 (e.g., hydraulic motors) as shown in FIG. 4. The motor(s) 140 can be driven by a hydraulic pump(s), electricity, or other suitable means and the drive state (e.g., including on and off states and optionally reverse state, and selected speed) of the motor(s) 140 is controlled as part of a control system. A controller 170 of the control system may be in direct or indirect control of the motor(s) 140, among other components of the chipper 100. Although the feed roller 132 may be capable of operating at more than one speed, this is not the subject of the present disclosure, so it may be assumed that the feed roller 132 operates at a fixed or variable speed. The infeed portion 130 may further include an infeed floor 135. In some embodiments, the feed roller 132 is movable toward and away from the infeed floor 135, for example by hydraulic cylinders 175 (one shown in FIGS. 2 and 4) that can selectively raise and lower the feed roller 132 relative to the infeed floor 135 under the command of the controller 170. Thus, a variable infeed passageway area 139 is defined between the feed roller 132 and the infeed floor 135. Adjustment of the feed roller 132 enables an adjustment of the gripping or crushing force exerted on the material 10 being fed into the chipper 100. The cylinders 175 also sufficiently depressurize to allow the feed roller 132 to float under certain circumstances. The infeed floor 135 can be provided by a conveyor, thus providing a second feed roller that works cooperatively with the feed roller 132 in delivering the material 10 to the cutting mechanism 124. Whether or not the infeed floor 135 includes a conveyor, the infeed portion 130 can include a second feed roller, or lower feed roller, positioned below the illustrated feed roller 132. Output from a sensor 172 (FIG. 4) indicates the position of the feed roller 132, for example with respect to a neutral position or with respect to the infeed floor 135.

One of ordinary skill in the art will appreciate that many of the various electrical and mechanical parts discussed herein can be combined together or further separated apart. The controller 170 may include one or more electronic processors and one or more memory devices. The controller 170 may be communicably connected to one or more sensors or other inputs, such as described herein. The electronic processor may be implemented as a programmable microprocessor, an application specific integrated circuit (ASIC), one or more field programmable gate arrays (FPGA), a group of processing components, or with other suitable electronic processing components. The memory device (for example, a non-transitory, computer-readable medium) includes one or more devices (for example, RAM, ROM, flash memory, hard disk storage, etc.) for storing data and/or computer code for completing or facilitating the various processes, methods, layers, and/or modules described herein. The memory device may include database components, object code components, script components, or other types of code and information for supporting the various activities and information structure described in the present application. According to one example, the memory device is communicably connected to the electronic processor and may include computer code for executing one or more processes described herein. The controller 170 may further include an input-output ("I/O") module. The I/O module may be configured to interface directly with one or more devices, such as a power supply, sensors, displays, etc. In one embodiment, the I/O module may utilize general purpose I/O (GPIO) ports, analog inputs/outputs, digital inputs/outputs, and the like.

Referring primarily to FIGS. 1 and 2, one or more operator controls 174, 176 may additionally be in data communication with the controller 170. The operator controls 174, 176 can include, for example, levers, switches, dials, buttons, or any other appropriate controls, whether now existing or later developed. In some embodiments, at least one of the operator controls 174, 176 is not in direct physical communication with the controller 170, and instead communicates with the controller 170 wirelessly, such as through one or more of near-field (e.g. Bluetooth, Bluetooth Low Energy, LoRA, Near Field Communication ("NFC"), Wi-Fi, Wi-Max, etc.), radio (e.g. RF), or cellular communication technology (e.g. 3G, 4G, 5G, LTE, etc.). Although prior chippers have provided multiple chipper settings through operator controls, thus providing divergent cutting and/or feeding parameters optimized for different infeed materials, the chipper 100 of the present disclosure may operate on the full gamut of infeed materials on a single chipper setting. In some constructions, the chipper 100 may only have a single chipper setting. However, the chipper 100 is configured to provide an infeed control via the controller 170 that is dynamic and automatic in responding and adapting to different materials fed into the chipper 100.

Although it is possible to size the prime mover 128 so as to enable the cutting mechanism 124 to perform material reduction with continuous infeed of the most demanding material acceptable by the infeed portion 130, this is generally impractical and/or unreasonable due to the wide range of variability in material (e.g., even limited to wood, there may be drastic differences in size, species having different hardness, moisture content, etc.) as this would lead to a gross oversizing of the prime mover 128 for most work operations. Thus, while less demanding material may be fed continuously to the cutting mechanism 124 during chipping, the infeed portion 130 is configured to perform cyclic material feeding for other more demanding material. That is, the infeed portion 130 will feed the material to the cutting mechanism 124, then stop (stopping the forward feeding, optionally also reversing), then feed again, and so on until the material is completely fed into the cutting mechanism 124 and processed thereby. The length of the cutting cycles will vary as forward feeding by the infeed portion 130 is stopped in accordance with a stop threshold or "trigger" of a monitored parameter. In some examples, the individual cutting cycles may average approximately 2-3 seconds. This type of cyclic feed control allows a smaller-sized prime mover 128 to be used in producing consistent size chips from more difficult material by operating in bursts so as to keep the operating speed of the cutting mechanism 124 within an ideal speed range. Satisfactory continuous cutting of the more difficult material 10 may otherwise be impossible due to overloading the prime mover 128, which would lead to stalling, or a dragging down of the cutting mechanism 124 out of its ideal speed range, for example, along with other possible consequences such as inefficient operation and even component damage under certain circumstances.

The stop threshold can correlate to a load exerted on the prime mover 128 and/or the cutting mechanism 124 during cutting. In other words, the stop threshold controls how much load is allowed on the prime mover 128 and/or the cutting mechanism 124 due to engagement of the material with the cutting mechanism 124. As discussed in further detail below, the stop threshold is variable in accordance with certain aspects of the invention to provide a dynamic infeed control that learns according to an iterative learning program executed by the controller 170 of the chipper 100, providing cycle-to-cycle adjustment during the feeding of a discrete piece of material, referred to hereinafter as an item 10 (e.g., branch, tree, log) to be reduced. The infeed control system operates to meet the objectives of: producing a consistent size of chip output from the cutting mechanism 124, and maintaining the prime mover 128 within a predetermined range of operation. An internal combustion engine responds naturally to increased cutting load with a reduction or droop in operating speed of the engine, given in crankshaft revolutions per minute (RPM) for example, from a predefined high idle engine speed setting at which the engine is set to run with no applied cutting load. As described in at least one specific example below, the predetermined range of operation may be defined by a minimum acceptable engine operating speed. The minimum acceptable engine operating speed can be preset and stored within a memory of the controller 170. The minimum acceptable engine operating speed can be set to maintain operation (avoid stalling) and more particularly to maintain operation within a desired power band of the engine. With a fixed relationship between operating speed of the prime mover 128 and operating speed of the cutting mechanism 124, the minimum acceptable engine operating speed correlates directly to a minimum acceptable operating speed of the cutting mechanism 124 (1:1 or another fixed ratio). However, it is also conceived that the cutting mechanism 124 and the prime mover 128 may have a non-fixed operating speed relationship. Aspects of the present disclosure may include monitoring the operating speed of the prime mover 128 and/or monitoring the operating speed of the cutting mechanism with at least one load sensor 178. In this case, the load sensor 178 does not measure actual load (force or torque), but rather a parameter indicative of load. In the case of an electric motor as the prime mover 128, the predetermined range of operation for the prime mover may be defined by an acceptable amount of electrical current draw. Thus, the load sensor 178 can take the form of a current sensing circuit or "current sensor." The dynamic infeed control, as described in further detail below, allows the chipper 100 to hone in on optimized cutting cycles of an item 10 during the course of the feeding of the item 10, even without any initial input information to the controller 170 regarding the characteristics of the item 10, such as size, wood species, etc.

Figure 5:
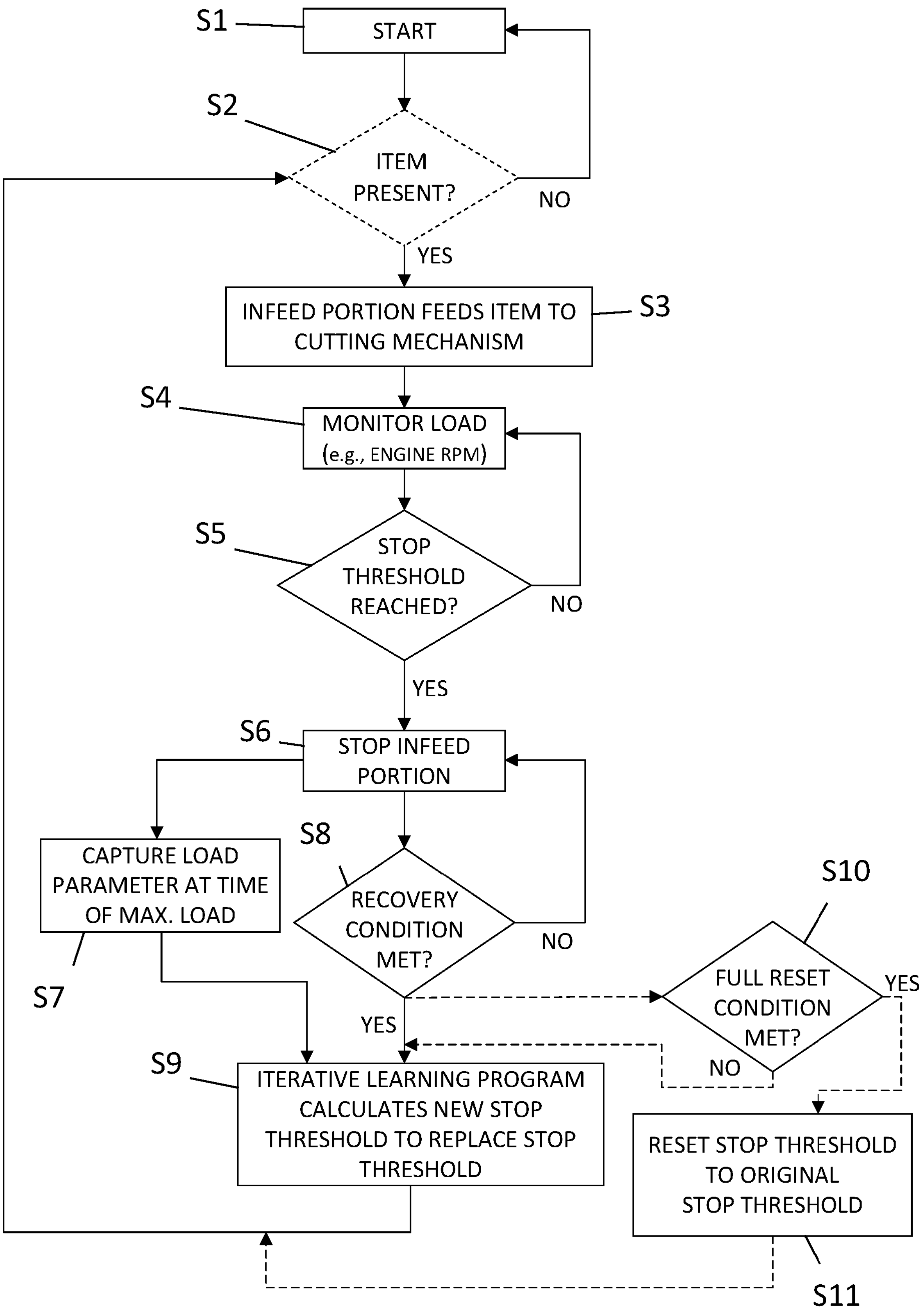
FIG. 5 illustrates a flowchart for an exemplary process carried out by the chipper of FIG. 1.

An exemplary sequence for the dynamic infeed control is schematically illustrated in FIG. 5, with the understanding that variations thereof are also within the scope of the present disclosure. The steps of the sequence shown in FIG. 5 are carried out within and by the controller 170 to accomplish the dynamic infeed control. The sequence starts at step S1, which may occur upon startup of the chipper 100 or may be triggered by a particular initialization, e.g., from the operator. At the optional step S2, the controller 170 determines whether or not material to be reduced (e.g., the item 10 of FIG. 4) is present. In some constructions, step S2 is eliminated and the process flows directly from step S1 to step S3. If incorporated, the determination of step S2 can be made on the basis of information from the sensor 172 reporting the position of the feed roller 132, although other means are optional, such as optical detection of material at or near the infeed portion 130 via an optical sensor (not shown). When material is not detected at step S2, the process reverts to step S1. In response to material being detected at step S2, or when S2 is not part of the process, the process continues to step S3 in which the infeed portion feeds material to the cutting mechanism 124 to start an initial cutting cycle. For example, the controller 170 may initiate the initial cutting cycle in response to sensing material being fed to the cutting mechanism 124. As mentioned above, some amount of load is inherent during the initial cutting cycle, but it is desirable to keep load on the cutting mechanism 124 and/or prime mover 128 within prescribed boundaries. As such, the controller 170 monitors load via a load parameter (e.g., via sensor 178) at step S4. As already noted, this parameter can be the operating speed of the cutting mechanism 124 or the prime mover 128 in some constructions. At step S5, values of the load parameter are monitored by the controller 170, periodically or continuously, to determine whether a stop threshold value for the load parameter has been reached. In response to the stop threshold value being reached, the infeed portion 130 is stopped by the controller 170 at step S6. The stop threshold value for the first cutting cycle can be a stored value accessed by the controller 170. For example, the stop threshold value may be stored in a memory (not shown) of the controller 170. The initial stop threshold value is not representative of the actual load threshold to be maintained. Rather, it is expected that actual load continues to increase briefly due to the lag in response of components (e.g., hydraulic) responsible for stopping the infeed portion 130 after recognition of the initial stop threshold. There may also be contributing lag in the reporting from the sensor 178 itself and/or within the controller 170. In any case, the construction of the chipper 100 makes it impractical to control maximum allowable load by using the maximum allowable load as the stop point, especially when the exact makeup of the material being input cannot readily be known.

After the infeed portion 130 is stopped at step S6, two subsequent actions take place. First, the controller 170 detects and stores the load parameter value at the time of maximum load at step S7. Second, the controller 170 monitors the load to determine whether a recovery condition indicative of reduced load is achieved at step S8 (e.g., a prescribed reduction in load value or percentage of load reduction from the maximum load). The maximum load occurs after the stop threshold is reached (S6) and prior to the recovery. In response to determining that the recovery condition is met, the chipper 100 is ready to start the next cutting cycle on the item 10, practically speaking. However, the controller 170 is configured to first determine, based on the preceding cutting cycle, how to run a modified next cutting cycle. In particular, the controller 170 calculates a second stop threshold (e.g. new stop threshold) value at step S9. In one embodiment, the maximum load following stoppage of the infeed portion at step S6 is the controlling parameter used in step S9 to calculate the second stop threshold. The second stop threshold replaces the initial (first) stop threshold (current stop threshold). The controller 170, in carrying out step S9, may compare and ascertain a difference between the maximum value of the load parameter from step S7 and a stored target value for the load parameter that corresponds to the maximum allowable load, e.g., according to a manufacturers recommendation based on empirical data. In the example of operating speed as the load parameter, this equates to a comparison between a lowest recorded operating speed (below the stop threshold operating speed) and a target value for lowest allowable operating speed. A correction factor can be applied to the calculated difference by the controller 170 in order to determine the second stop threshold to be used for the next cutting cycle. The equation may be expressed as $n_{i+1}=n_i+k*(nX-nY)$ where $n_i$ is the original or first stop threshold operating speed, nX is the target value or lowest allowable operating speed, nY is the lowest recorded engine speed during a chipping cycle, k is the correction factor, and $n_{i+1}$ is the calculated subsequent stop threshold operating speed.

The correction factor, which may be pre-programmed to the controller 170, may be 1 or less, for example 0.25 or 0.3. The sign of the difference (of nX−nY) may be expected to result in a negative value such that the second stop threshold $n_i$-pi will be lower than the initial stop threshold $n_i$, since the initial stop threshold may be set as a value highly likely to prevent the actual maximum load from exceeding the maximum allowable load. Thus, the first cutting cycle may utilize a stop threshold that leaves a positive safety margin with respect to the actual maximum allowable load. As long as the cutting action on the item remains reasonably similar from cycle to cycle, the newly calculated stop threshold for the second cutting cycle then enables the actual maximum load during stopping of the second cutting cycle to come closer to the maximum allowable load. It should be appreciated that the controller 170 does not in any circumstance have direct control over how much cutting load is applied, since the load is simply applied in an on/off manner by feeding or stopping the item 10. In the event that a given stop threshold is not sufficient to maintain actual maximum load from surpassing the maximum allowable load, then the above calculation enables the controller 170 to set the next stop threshold higher than the preceding one. As shown in FIG. 5, the controller 170 returns to step S3 in response to calculating the new stop threshold so that the chipper 100 performs sequential cutting cycles on the material as long as the material is detected to still be present. Thus, the load data gathered at the end of the second cutting cycle is used by the controller 170 to calculate a third stop threshold in a manner similar to how the second stop threshold was calculated on the data from the first cutting cycle, and so on and so forth for as many cutting cycles as are required to get through the particular item being fed to the cutting mechanism 124. As such, the actual maximum load determined will, on a cycle-by-cycle basis, gradually home in on or creep toward the maximum allowable load limit prescribed for the chipper 100 as the controller 170 learns how the chipper 100 responds to an item 10 during reduction of the item 10. In other words, the safety margin is dynamically reduced by the controller 170 so that the chipper 100 operates at or near its full capability despite not having manual or operator-controlled variable settings.

After a number of cutting cycles, the item 10 is fully fed and no longer loading the cutting mechanism 124. When this occurs, the controller 170 returns to step S2 and the feed roller 132 runs, awaiting the next item. When the next item is inserted, the initial stop threshold can simply be the final stop threshold from the plurality of cutting cycles performed on the first item 10. Thus, the processing of the second item will be more efficient than the first (getting nearer the maximum allowable load quicker and resulting in longer cutting cycles) in the case that the second item is suitably similar to the first. In the presence of certain circumstances, the stop threshold is reset to the initial stored stop threshold (the stop threshold prior to any iterative learning). This is illustrated schematically by steps S10 and S11, which if included in the controller program, may obstruct the controller 170 from carrying out step S9 in the case of a YES response at step S10. The full reset condition of step S10 can be detection of no material in the infeed portion 130 for a prescribed time, or detection of the prime mover 128 being at a no load state for a prescribed time. In other constructions, the stop threshold is reset to the initial stored stop threshold each time that completion of an item 10 is detected.

Figure 6:
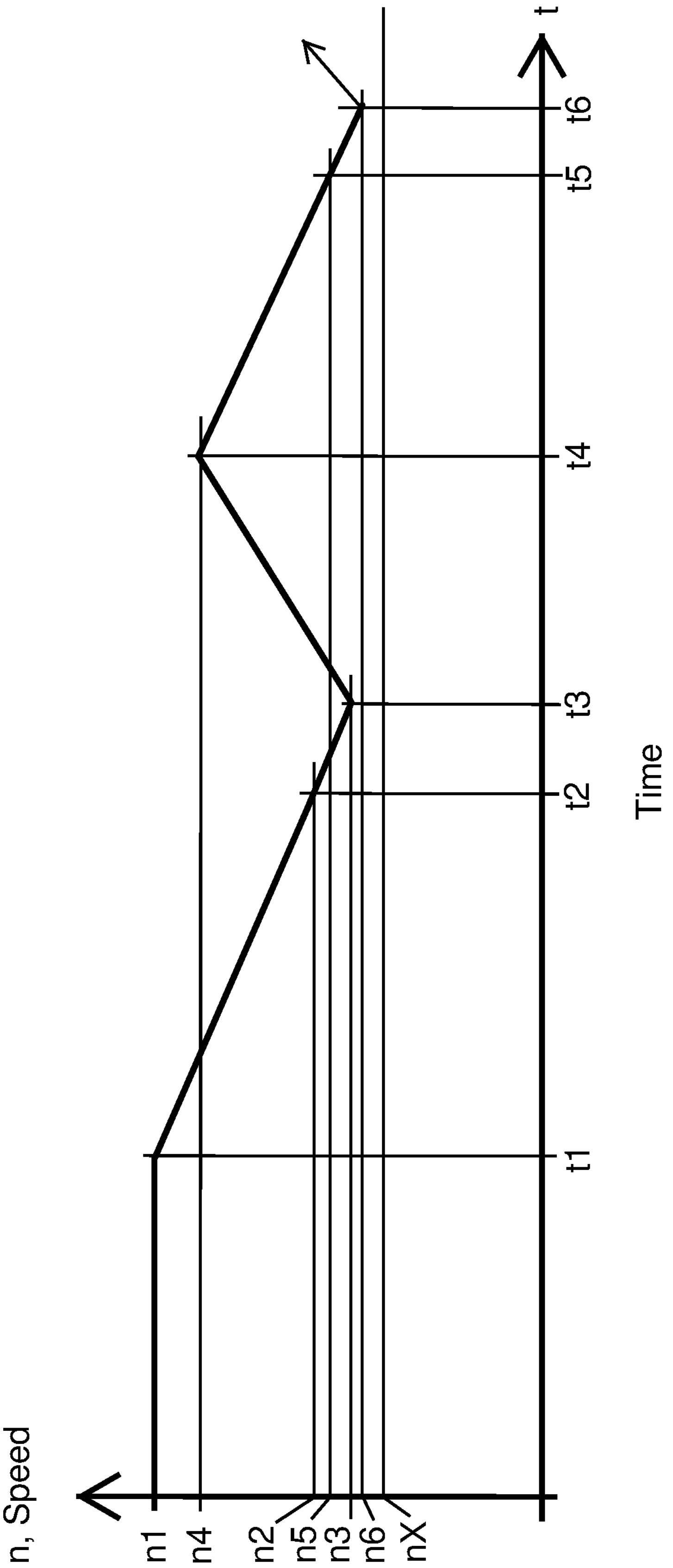
FIG. 6 is a graph of operating speed vs. time, illustrating two sequential cutting cycles carried out by the chipper.

FIG. 6 illustrates an exemplary plot of operating speed (n) of an internal combustion engine providing the prime mover 128 (or of the cutting mechanism 124) versus time (t). Beginning at time t0, the engine operates at a steady high idle speed n1. In the context of FIG. 6 and its description, times of interest are labeled sequentially as t1, t2, etc. The operating speed n1 is the operating speed at time t1, the operating speed n2 is the operating speed at time t2, and so forth. This is done for simplicity in the description and comprehension of FIG. 6, and it bears noting that this convention results in the first stop threshold identified as n2 and the second stop threshold identified as n5, although they are sequential stop thresholds as per the $n_i$ and $n_{i+1}$ notation from above. The cutting mechanism 124 is not yet loaded by feeding of the item 10. Once feeding begins at time t1 (e.g., step S3 above), load on the cutting mechanism 124 begins to increase, and the load is conveyed to the engine through the coupling therebetween. Thus, the first cutting cycle begins at time t1. The load exhibits as a reduction in operating speed, which can be seen between times t1 and t2. Although shown as linear for simplicity, the operating speed may slow down nonlinearly in other constructions, and the shape of the curve may depend at least in part on the characteristics of the item 10 and the operation of the feed roller 132. At time t2, the initial stop threshold n2 is reached (step S5) and feeding of the item is immediately stopped (step S6). However, due to the mechanics of the chipper 100, the cutting cycle continues momentarily and the load on the engine persists and continues to increase somewhat up until time t3. The first cutting cycle completes at time t3, where the engine speed reaches a minimum n3 and begins to increase during “recovery” of the engine. As will be appreciated, the event (infeed stop) at time t2 is directly controlled by the controller 170. On the other hand, the minimum engine speed at time t3 is not directly controlled by the controller 170, although it is resultant from the performance of the chipper 100 directly following the event at time t2. From time t3 to time t4, the operating speed naturally recovers and increases to a reset speed n4 at or near the high idle speed n1.

Also, after capturing the minimum operating speed n3, the controller 170 determines the difference between the minimum operating speed n3 and the minimum allowable operating speed nX. The correction factor is then applied to the difference to determine the stop threshold n5 for the second cutting cycle. The second cutting cycle commences at time t4, and the load again causes droop in engine operating speed until the second stop threshold n5 is reached at time t5. Assuming consistency in the item 10 and consistency of performance of the chipper 100, the continued droop in engine operating speed from time t5 to time t6 where the minimum operating speed n6 is observed will be very similar to that experienced from time t2 to time t3 at the end of the first cutting cycle. Thus, the iterative learning program allows the minimum operating speed n6 following the second stop threshold to encroach upon the minimum allowable operating speed nX. From time t6, the engine again recovers (along the dotted line), and the controller determines a new stop threshold for the next (third) cutting cycle based on the difference between nX and n6 and based on the correction factor. These steps repeat continuously, as the controller 170 learns how to set the stop threshold appropriately to come as close as possible to the predetermined minimum allowable operating speed nX, which is the speed preset to maintain operation within the desired performance range. As noted above, the controller 170 may revert back to the initial stop threshold n2 when certain conditions are met, or upon each start-up of the chipper 100. However, in some constructions, the controller 170 does not automatically revert to the initial stop threshold n2 between sequential items 10, but rather maintains the most recent stop threshold from the most recent cutting cycle. This amounts to an assumption by the controller 170 that the next item fed will be similar to the one immediately preceding. Although sequential items 10 will not always be the same, this assumption allows an even quicker encroachment upon the minimum allowable operating speed nX for the next item 10 when the sequential items 10 are similar in their overall resistance to being reduced. When sequential items 10 are notably different, the controller’s iterative learning program still allows the chipper 100 to respond dynamically on a cycle-by-cycle basis to set an appropriate stop threshold for the new item 10. In the case of conditions resulting in the occurrence of a minimum operating speed below the minimum allowable operating speed nX, the controller 170 may be programmed to apply a second correction factor (e.g., 1 or more, although less than 2) greater than the normal correction factor so as to minimize the number of cutting cycles where such a phenomenon occurs.

Figure 7:
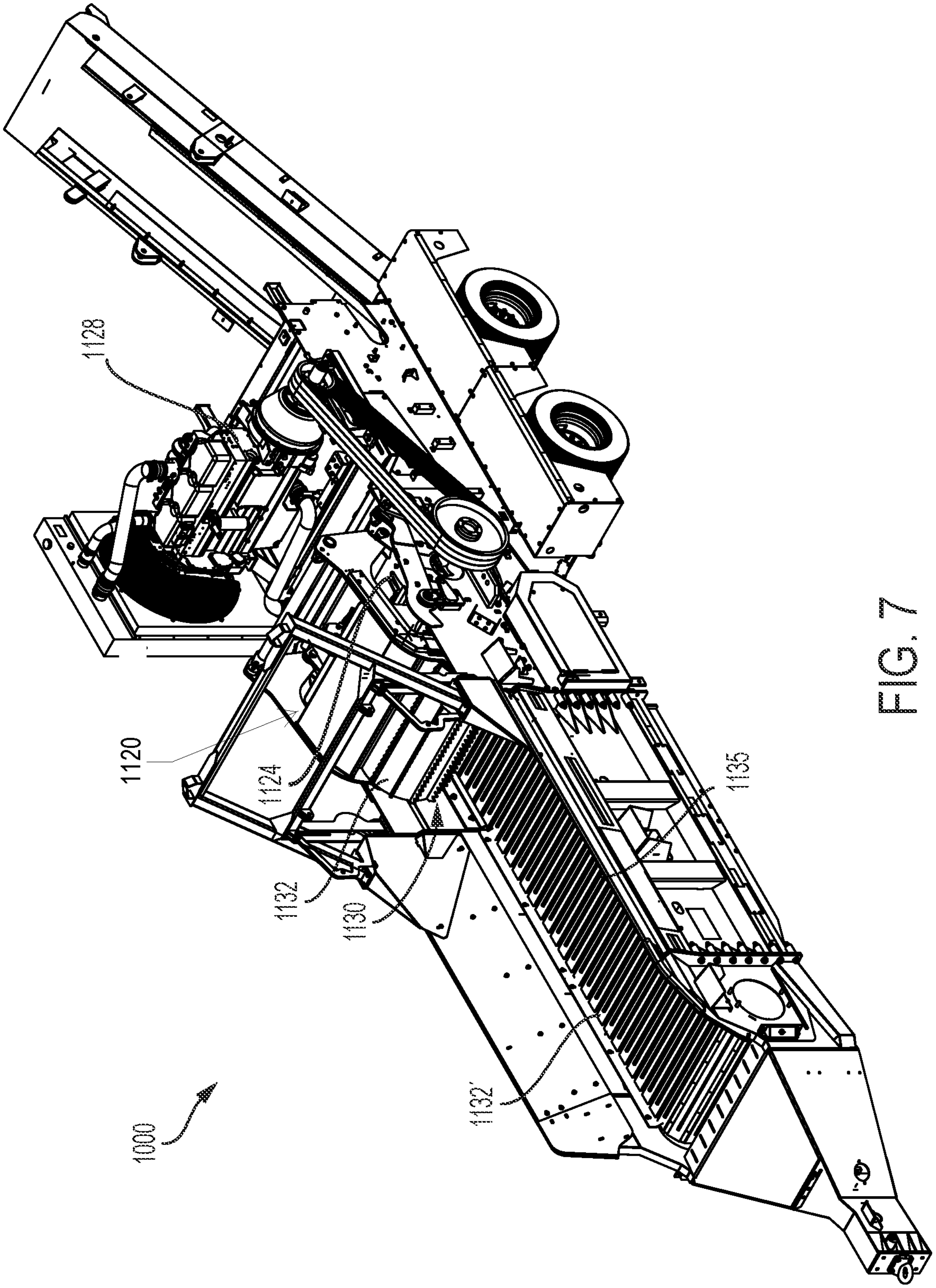
FIG. 7 is a perspective view of a grinder according to one embodiment of the present disclosure.

FIG. 7 illustrates another material reduction machine, in particular a grinder 1000, to which aspects of the present disclosure may also be applied. Despite the physical differences between the chipper 100 and the grinder 1000, some of which are detailed below, the grinder 1000 may provide dynamic infeed control that follows the preceding description. Thus, the description of the grinder 1000 is kept to a minimum so as to avoid unnecessary repetition. The grinder infeed portion 1130 primarily differs from the infeed portion 130 shown in FIGS. 1-4 by having a powered conveyor 1132' (i.e., another feed roller) at the infeed floor 1135 such that material passes between the two feed rollers 1132, 1132' before reaching the processing portion 1120. The second feed roller 1132' may be operated in the same manner as the feed roller 1132, for example with one or more motors, either providing fixed or variable infeed speed of material to the processing portion 1120. In the grinder 1000, the processing portions 1120 includes a plurality of hammers or cutters, e.g., mounted on a rotating drum, providing a cutting mechanism 1124, that cut (or more particularly in some cases “crush”) material into smaller pieces. The cutting mechanism 1124 is coupled to the prime mover 1128, e.g., internal combustion engine, with a fixed drive ratio (provided by a belt extended between two drive wheels). Despite some fundamental constructional differences between the grinder 1000 and the chipper 100, the grinder 1000 can also be provided with sensors and a controller according to the description of the chipper 100 so that the grinder 1000 is configured to provide dynamic infeed control that changes the stop points for stopping sequential cutting cycles according to maximum load data on a cycle-by-cycle basis.

Although the invention has been described in detail with reference to certain preferred embodiments, variations and modifications exist within the scope and spirit of one or more independent aspects of the invention as described.

What is claimed is:

1. A material reduction machine comprising:

a cutting mechanism;

a prime mover coupled with the cutting mechanism to drive the cutting mechanism;

an infeed portion operable to engage a piece of material to be comminuted by the cutting mechanism and to feed the piece of material to the cutting mechanism;

a sensor operable to sense a machine load parameter via detection of at least one of the cutting mechanism and the prime mover; and a controller coupled to the sensor and configured to receive a signal representing the sensed machine load parameter, the controller being operatively coupled to the infeed portion to control stopping and starting of each of a plurality of sequential cutting cycles on the piece of material, wherein the controller is further configured to:

utilize a stored first stop threshold value of the machine load parameter for stopping a first cutting cycle of the plurality of sequential cutting cycles when the sensor signals to the controller that the first stop threshold value is attained, continue monitoring the sensor signal as machine load increases momentarily after reaching the first stop threshold, determine and adopt a second stop threshold value, the second stop threshold value being based on an observation of the machine load parameter indicative of maximum load during the continued monitoring following attainment of the first stop threshold, and further being based on a stored correction factor, and utilize the second stop threshold value for stopping a second cutting cycle of the plurality of sequential cutting cycles following the first cutting cycle when the sensor signals to the controller that the second stop threshold value is attained.

2. The material reduction machine of claim 1, wherein the controller is further configured to adopt a third stop threshold value, the third stop threshold value being based on an observation of the machine load parameter indicative of maximum load during continued monitoring of the sensor signal following attainment of the second stop threshold, and further being based on the correction factor.

3. The material reduction machine of claim 1, wherein the controller is further configured to calculate a difference between a target value of the machine load parameter corresponding to a maximum allowable machine load and the value of the machine load parameter indicative of the maximum load after the first stop threshold is attained, and calculate the second stop threshold value by applying the correction factor to the calculated difference so that the actual maximum machine load following attainment of the second stop threshold is brought closer to the maximum allowable machine load than the actual maximum machine load after the first stop threshold is attained.

4. The material reduction machine of claim 1, wherein the prime mover is an internal combustion engine and the machine load parameter is the operation speed of the internal combustion engine.

5. The material reduction machine of claim 1, wherein the machine load parameter is the operation speed of the cutting mechanism.

6. The material reduction machine of claim 1, wherein the prime mover is an electric motor and the machine load parameter is a torque output from the electric motor or an electrical current draw by the electric motor.

7. The material reduction machine of claim 1, wherein the controller is further configured to identify completion of the comminution of the piece of material, and in response to identifying the completion of the comminution of the piece of material, reset the stop threshold value to the stored first stop threshold value for a first cutting cycle on a second piece of material to be comminuted by the cutting mechanism.

8. The material reduction machine of claim 7, wherein the controller is further configured to identify completion of the comminution of the piece of material with a timer that identifies in response to the machine load parameter reported by the sensor indicates no load on the cutting mechanism for a predetermined amount of elapsed time.

9. The material reduction machine of claim 7, wherein the controller is further configured to identify completion of the comminution of the piece of material based on sensed parameter(s) from a sensor on the infeed portion.

10. The material reduction machine of claim 1, wherein the controller is further configured to maintain a final stop threshold value calculated during the plurality of sequential cutting cycles on the piece of material, and to apply the final stop threshold value for a first cutting cycle on a second piece of material to be comminuted by the cutting mechanism.

11. The material reduction machine of claim 1, wherein the material reduction machine is a brush chipper having a plurality of comminution knives.

12. The material reduction machine of claim 1, wherein the material reduction machine is a horizontal grinder having a plurality of comminution hammers.

13. A material reduction machine comprising:

a cutting mechanism;

an internal combustion engine coupled with the cutting mechanism to drive the cutting mechanism;

an infeed portion operable to engage a piece of material to be comminuted by the cutting mechanism and to feed the piece of material to the cutting mechanism;

a sensor operable to sense a load on the material reduction machine via detection of droop in the operation speed of at least one of the cutting mechanism and the internal combustion engine; and a controller coupled to the sensor and configured to receive a signal indicative of the sensed droop in the operation speed, the controller being operatively coupled to the infeed portion to control stopping and starting of each of a plurality of sequential cutting cycles on the piece of material, wherein the controller is configured to utilize a stored first operation speed trip point for stopping a first cutting cycle of the plurality of sequential cutting cycles when the sensor signals to the controller that the first operation speed trip point is attained, and to continue monitoring further droop in the operation speed via the sensor signal as machine load increases momentarily after reaching the first operation speed trip point, determine and adopt a second operation speed trip point, the second operation speed trip point being based on an observation of a minimum operation speed during the continued monitoring following attainment of the first operation speed trip point, and further being based on a stored correction factor, and utilize the second operation speed trip point for stopping a second cutting cycle of the plurality of sequential cutting cycles following the first cutting cycle when the sensor signals to the controller that the second operation speed trip point is attained.

14. The material reduction machine of claim 13, wherein the controller is further configured to adopt a third operation speed trip point based on an observation of a minimum operation speed during continued monitoring of the sensor signal after the second operation speed trip point is attained, and further based on the correction factor.

15. The material reduction machine of claim 13, wherein the controller is further configured to calculate a difference between the minimum operation speed during the continued monitoring following attainment of the first operation speed trip point and a stored target operation speed corresponding to a minimum allowable operation speed, and wherein the controller is further configured to calculate the second stop threshold value by applying the correction factor to the calculated difference so that the minimum operation speed following attainment of the second stop threshold is brought closer to the target operation speed than the minimum operation speed after the first stop threshold is attained.

16. The material reduction machine of claim 15, wherein the controller is further configured to calculate, for every new cutting cycle of the plurality of sequential cutting cycles beyond the first cutting cycle, a new operation speed trip point based on the difference between the target operation speed and the minimum operation speed observed at the end of the cutting cycle immediately prior to the new cutting cycle.

17. The material reduction machine of claim 13, wherein the controller is further configured to identify completion of the comminution of the piece of material, and in response, to revert to the stored first operation speed trip point for a first cutting cycle on a second piece of material to be comminuted by the cutting mechanism.

18. The material reduction machine of claim 17, wherein the controller is further configured to identify completion of the comminution of the piece of material with a timer that identifies when the operation speed reported by the sensor indicates no load on the cutting mechanism for a predetermined amount of elapsed time.

19. The material reduction machine of claim 17, wherein the controller is further configured to identify completion of the comminution of the piece of material with a sensor on the infeed portion.

20. The material reduction machine of claim 13, wherein the controller is further configured to maintain a final operation speed trip point calculated during the plurality of sequential cutting cycles on the piece of material, and to apply the final operation speed trip point for a first cutting cycle on a second piece of material to be comminuted by the cutting mechanism.

21. The material reduction machine of claim 13, wherein the material reduction machine is a brush chipper having a plurality of comminution knives.

22. The material reduction machine of claim 13, wherein the material reduction machine is a horizontal grinder having a plurality of comminution hammers.

23. A method of controlling a material reduction machine including a cutting mechanism and a prime mover coupled with the cutting mechanism to drive the cutting mechanism, the method comprising:

operating the prime mover to drive the cutting mechanism at a no load operation speed;

feeding a piece of material to be comminuted to the cutting mechanism by operation of an infeed portion to start a first cutting cycle;

sensing, with a sensor that reports signals to a controller in control of the infeed portion to control stopping and starting of each of a plurality of sequential cutting cycles on the piece of material, a machine load parameter via detection of at least one of the cutting mechanism and the prime mover;

triggering, via the controller, stopping of a first cutting cycle of the plurality of sequential cutting cycles in response to the sensor signaling to the controller that a stored first stop threshold value is attained;

continuing monitoring, with the controller, the machine load parameter sensor signal as machine load increases to a maximum load momentarily after reaching the first stop threshold, the controller determining and adopting a second stop threshold value based on the value of the machine load parameter at the time of maximum load following attainment of the first stop threshold, and further based on a stored correction factor; and triggering, via the controller, stopping a second cutting cycle of the plurality of sequential cutting cycles following the first cutting cycle in response to the sensor signaling to the controller that the second stop threshold value is attained.

* * * * *